United States Patent
Zhou

(10) Patent No.: US 10,633,771 B2
(45) Date of Patent: Apr. 28, 2020

(54) COTTON OPENING AND DUST COLLECTING DEVICE FOR REFINED COTTON

(71) Applicant: HUBEI JINHANJIANG REFINED COTTON CO., LTD., Zhongxiang, Hubei (CN)

(72) Inventor: Hangxu Zhou, Hubei (CN)

(73) Assignee: HUBEI JINHANJIANG REFINED COTTON CO., LTD. (CN)

( * ) Notice: Subject to any disclaimer, the term of this patent is extended or adjusted under 35 U.S.C. 154(b) by 234 days.

(21) Appl. No.: 15/920,453

(22) Filed: Mar. 14, 2018

(65) Prior Publication Data

US 2018/0266020 A1 Sep. 20, 2018

(30) Foreign Application Priority Data

Mar. 18, 2017 (CN) .................... 2017 2 0264714 U

(51) Int. Cl.
| | |
|---|---|
| *B01D 50/00* | (2006.01) |
| *D01G 9/12* | (2006.01) |
| *B04C 5/24* | (2006.01) |
| *B04C 9/00* | (2006.01) |
| *B01D 45/16* | (2006.01) |
| *B01D 46/10* | (2006.01) |
| *D01G 9/08* | (2006.01) |
| *D01G 9/16* | (2006.01) |
| *D01G 9/22* | (2006.01) |

(52) U.S. Cl.
CPC .............. *D01G 9/12* (2013.01); *B01D 45/16* (2013.01); *B01D 46/10* (2013.01); *B01D 50/002* (2013.01); *B04C 5/24* (2013.01); *B04C 9/00* (2013.01); *D01G 9/08* (2013.01); *D01G 9/16* (2013.01); *D01G 9/22* (2013.01); *B04C 2009/002* (2013.01); *B04C 2009/005* (2013.01)

(58) Field of Classification Search
CPC .. D01G 9/12; D01G 9/08; D01G 9/16; D01G 9/22; B04C 5/24; B04C 9/00; B04C 2009/005; B04C 2009/002; B01D 45/16; B01D 46/10; B01D 50/002
See application file for complete search history.

(56) References Cited

U.S. PATENT DOCUMENTS

| | | | | |
|---|---|---|---|---|
| 3,122,425 A | * | 2/1964 | Wasp | ........................ F26B 3/00 34/363 |
| 3,473,300 A | * | 10/1969 | Jordan | ................. B01D 46/002 55/302 |
| 3,494,107 A | * | 2/1970 | Sackett, Sr. | ............... B04C 9/00 96/265 |

(Continued)

Primary Examiner — Dung H Bui

(57) ABSTRACT

The present invention relates to a cotton opening and dust collecting device for refined cotton, which comprises a first cyclone separator, a second cyclone separator, a first draught fan, a second draught fan and a spiral conveyer, and further comprises a suction pipe, a dust collecting cabin, a screen plate, a motor, a dust extraction pipe, a first bearing, a second bearing, a first pipeline, a second pipeline, a third pipeline and a forth pipeline. The device is able to complete collection to the cotton dust in the air in the cotton opening workshop, which not only can effectively prevent the screen plate from being blocked by the cotton dust, but also has good dust collection effect and complete collection of cotton dust.

6 Claims, 3 Drawing Sheets

(56) References Cited

U.S. PATENT DOCUMENTS

| | | | | | |
|---|---|---|---|---|---|
| 3,537,188 | A | * | 11/1970 | Harris | F26B 17/101 |
| | | | | | 34/592 |
| 4,227,893 | A | * | 10/1980 | Shaddock | B60P 1/60 |
| | | | | | 15/340.1 |
| 4,423,987 | A | * | 1/1984 | Powers | B03B 9/06 |
| | | | | | 141/104 |
| 4,477,269 | A | * | 10/1984 | Laughlin | B01D 46/26 |
| | | | | | 55/290 |
| 4,587,979 | A | * | 5/1986 | Hagemann | A24C 5/392 |
| | | | | | 131/109.2 |
| 5,104,429 | A | * | 4/1992 | Miller | B01D 46/0042 |
| | | | | | 55/293 |
| 8,523,093 | B1 | * | 9/2013 | Siladi | B29B 17/02 |
| | | | | | 241/24.18 |
| 8,574,365 | B2 | * | 11/2013 | Wagner | B01D 45/12 |
| | | | | | 118/603 |
| 2006/0123745 | A1 | * | 6/2006 | Pobihushchy | E02F 3/8816 |
| | | | | | 55/354 |
| 2011/0265342 | A1 | * | 11/2011 | Shi | F26B 3/084 |
| | | | | | 34/480 |
| 2017/0203253 | A1 | * | 7/2017 | Zhu | B01D 53/60 |

* cited by examiner

COTTON OPENING AND DUST COLLECTING DEVICE FOR REFINED COTTON

FIELD

The present invention relates to the field of dust collecting device technology, and more particularly, to a cotton opening and dust collecting device for refined cotton.

BACKGROUND

The refined cotton is white cotton fibre made by boiling, bleaching and drying with the cotton linter as the material. The main technological process of the refined cotton is: material preparation→cotton opening→material feeding-→boiling→delivery by dry method→bleaching→grinding→drying→package. Wherein, a lot of cotton dusts can be generated in the cotton opening process of the cotton linter, which not only affects the manual operation, but also affects the environment. Common dust collecting device is currently used, since the cotton dust generated in cotton opening is fine in flocculence, which is easy to gather into a cluster and is easy to block the filter screen at the air inlet of the dust collecting device, and although the cotton dust blocking the filter screen is usually cleaned, the dust collecting effect is still affected. Meanwhile, the cotton dust is discharged to the air after dust collecting treatment, which pollutes the environment.

SUMMARY

The object of the invention is to provide a cotton opening and dust collecting device for refined cotton that has reasonable structure, can effectively prevent the blocking, has good dust collection effect and completely collects the cotton dust to solve the deficiency above.

The technical solution used by the patent to solve the technical problem above is as follows.

A cotton opening and dust collecting device for refined cotton comprises a first cyclone separator, a second cyclone separator, a first draught fan, a second draught fan and a spiral conveyer, wherein the first cyclone separator is respectively provided with a first wind inlet, a first wind outlet and a first discharge opening, the second cyclone separator is respectively provided with a second wind inlet, a second wind outlet and a second discharge opening, the first draught fan is respectively provided with a first air inlet and a first air outlet, the second draught fan is respectively provided with a second air inlet and a second air outlet, and the spiral conveyer is respectively provided with a feed port and a discharge port, the cotton opening and dust collecting device for refined cotton further comprises a suction pipe, a dust collecting cabin, a screen plate, a motor, a dust extraction pipe, a first bearing, a second bearing, a first pipeline, a second pipeline, a third pipeline and a forth pipeline, the front side wall of the dust collecting cabin is provided with a wind inlet and a collection port, the suction pipe is communicated with the interior of the dust collecting cabin through the wind inlet, the suction pipe is provided with suction inlets in rows, a cabin gate is movably installed in the collection port of the dust collecting cabin, the screen plate is installed in the dust collecting cabin to separate the interior of the dust collecting cabin into a front chamber and a back chamber, the screen plate is provided with a through hole, the middle part of the screen plate is provided with a support, the support is provided with a via hole and a first clamping groove which are mutually penetrated, the dust extraction pipe is located in the front chamber, the back side of the dust extraction pipe is provided with a first clamping plate, the first clamping plate of the dust extraction pipe is movably clamped in the first clamping groove through the first bearing, the motor is fixedly installed in the support through a bracket, the output shaft of the motor is fixedly connected to the first clamping plate of the dust extraction pipe, the back side wall of the dust extraction pipe is provided with a dust suction inlet, the dust suction inlet is provided with a rubber dust suction sleeve, the rubber dust suction sleeve is contacted with the screen plate, the front side wall of the dust extraction pipe is provided with a wind outlet, the wind outlet is provided with a second clamping groove, the first pipeline is fixedly installed in the dust collecting cabin, the front end part of the first pipeline is provided with a second clamping plate, the second clamping groove of the dust extraction pipe is movably clamped in the second clamping plate through the second bearing, the first pipeline is communicated with the dust extraction pipe through the wind outlet, the first cyclone separator and the spiral conveyer are respectively installed in the back chamber of the dust collecting cabin, the back side wall of the dust collecting cabin is provided with a first via hole, a second via hole and a third via hole, the back end of the first pipeline is communicated with the first air inlet of the first draught fan after respectively penetrating through the through hole and the first via hole, one end of the second pipeline is communicated with the first air outlet of the first draught fan, the other end of the second pipeline is communicated with the first wind inlet of the first cyclone separator after penetrating through the second via hole, the feed port of the spiral conveyer is communicated with the first discharge opening of the first cyclone separator, the discharge port of the spiral conveyer is located outside the dust collecting cabin after penetrating through the third via hole, the back side wall of the dust collecting cabin is further provided with a wind outlet, the second air inlet of the second draught fan is communicated with the wind outlet through the third pipeline, and the second air outlet of the second draught fan is communicated with the second wind inlet of the second cyclone separator through the fourth pipeline.

The screen plate consists of a separation plate, a filter screen and a bracket, the separation plate is fixedly installed in the inner side wall of the dust collecting cabin, the separation plate is provided with round holes, the bracket is installed in the round holes, the filter screen is fixedly installed in the bracket, the support is installed on the bracket, the rubber dust suction sleeve is tightly pressed on the filter screen, and the through hole is located below the separation plate.

The first pipeline is installed in the dust collecting cabin through the first bracket.

The dust extraction pipe is a square pipe.

Through using the technical solution above, the invention can reach the beneficial effect that: the device achieves complete collection to the cotton dust in the air in the cotton opening workshop, which not only can effectively prevent the screen plate from being blocked by the cotton dust, but also has good dust collection effect and complete collection of cotton dust.

DETAILED DESCRIPTION

Figure 1:
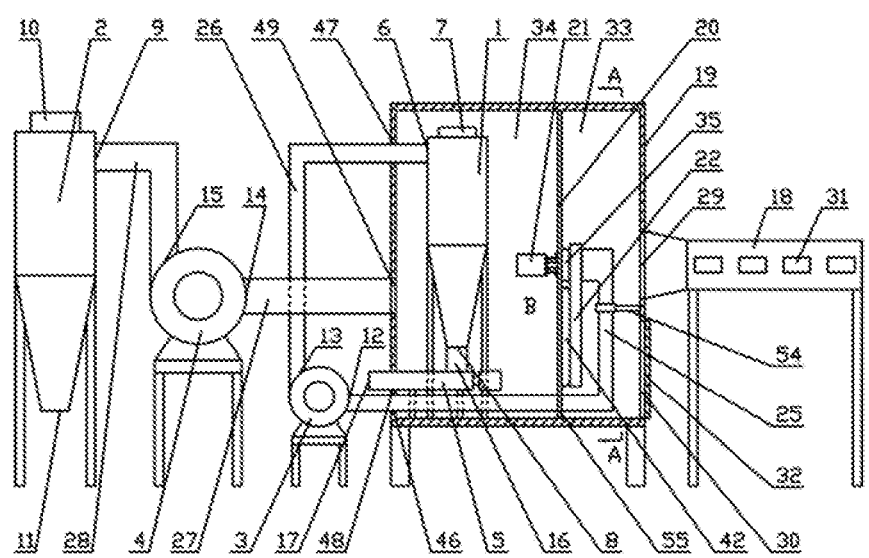
FIG. 1 is a schematic diagram of the structure of the cotton opening and dust collecting device.
Figure 2:
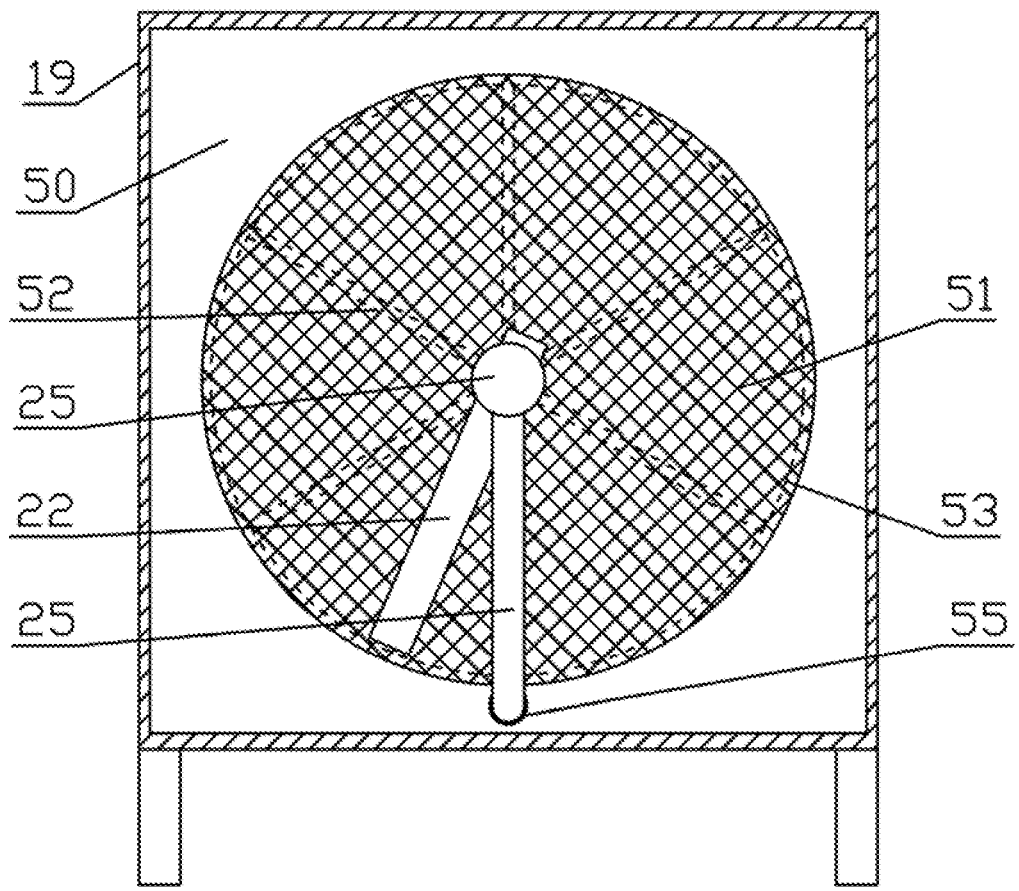
FIG. 2 is a schematic diagram of the structure in an A-A section view of FIG. 1.
Figure 3:
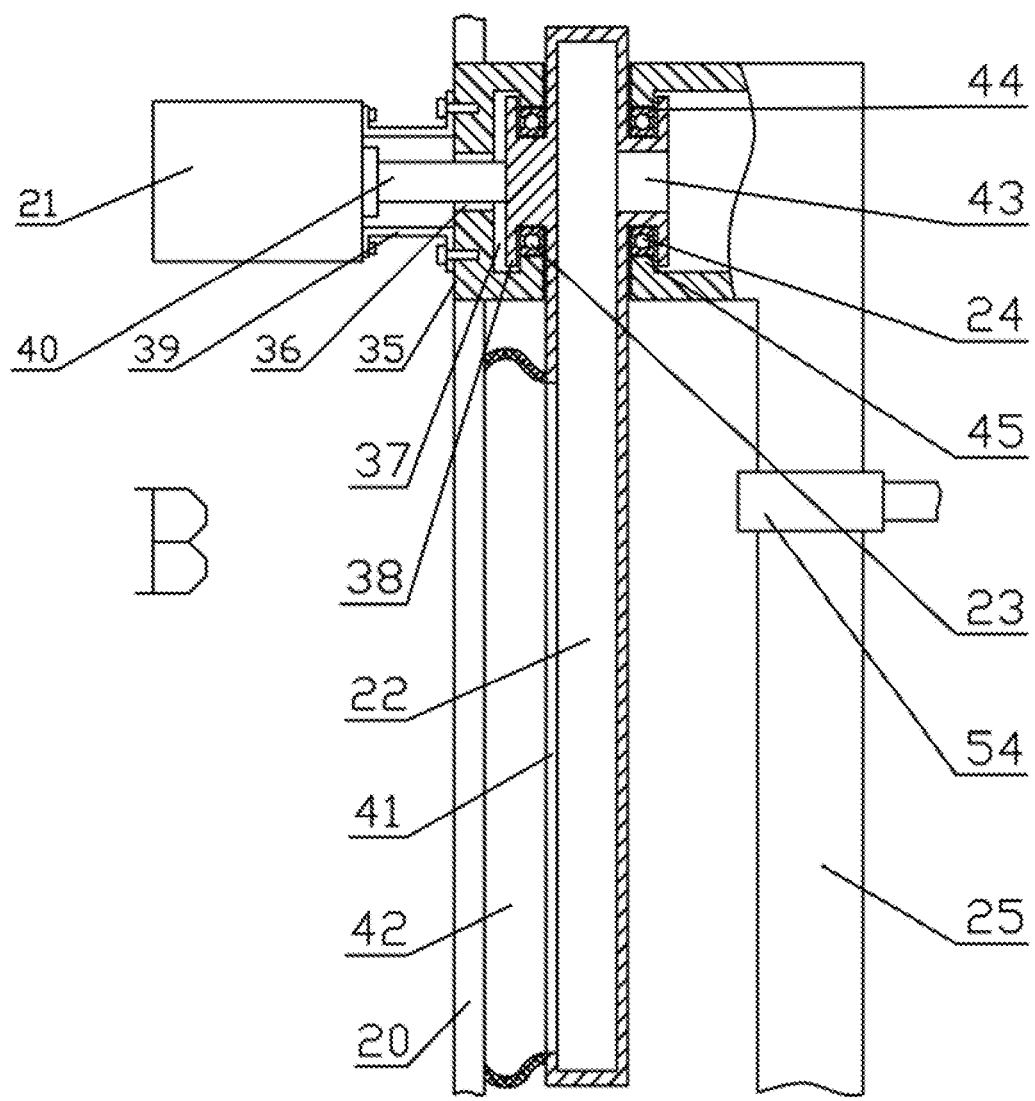
FIG. 3 is a schematic diagram of local structure of B pan in FIG. 1.

As shown in FIG. 1, FIG. 2 and FIG. 3, a cotton opening and dust collecting device for refined cotton comprises a first cyclone separator 1, a second cyclone separator 2, a first draught fan 3, a second draught fan 4 and a spiral conveyer 5, the first cyclone separator 1 is respectively provided with a first wind inlet 6, a first wind outlet 7 and a first discharge opening 8, the second cyclone separator 2 is respectively provided with a second wind inlet 9, a second wind outlet 10 and a second discharge opening 11, the first draught fan 3 is respectively provided with a first air inlet 12 and a first air outlet 13, the second draught fan 4 is respectively provided with a second air inlet 14 and a second air outlet 15, the spiral conveyer 5 is respectively provided with a feed port 16 and a discharge port 17, and all the first cyclone separator 1, the second cyclone separator 2, the first draught fan 3, the second draught fan 4 and the spiral conveyer 5 can be directly purchased from the market, the cotton opening and dust collecting device for refined cotton further comprises a suction pipe 18, a dust collecting cabin 19, a screen plate 20, a motor 21, a dust extraction pipe 22, a first bearing 23, a second bearing 24, a first pipeline 25, a second pipeline 26, a third pipeline 27 and a forth pipeline 28, the front side wall of the dust collecting cabin 19 is provided with a wind inlet 29 and a collection port 30, the suction pipe 18 is communicated with the interior of the dust collecting cabin 19 through the wind inlet 29, the suction pipe 18 is provided with suction inlets 31 in rows, a cabin gate 32 is movably installed in the collection port 30 of the dust collecting cabin 19, the screen plate 20 is installed in the dust collecting cabin 19 to separate the interior of the dust collecting cabin 19 into a front chamber 33 and a back chamber 34, the screen plate 20 is provided with a through hole 55, the middle part of the screen plate 20 is provided with a support 35, the support 35 is provided with a via hole 36 and a first clamping groove 37 which are mutually penetrated, the dust extraction pipe 22 is located in the front chamber 33, the back side of the dust extraction pipe 22 is provided with a first clamping plate 38, the first clamping plate 38 of the dust extraction pipe 22 is movably clamped in the first clamping groove 37 through the first bearing 23, the motor 21 is fixedly installed in the support 35 through a bracket 39, the output shaft 40 of the motor 21 is fixedly connected to the first clamping plate 38 of the dust extraction pipe 22, the back side wall of the dust extraction pipe 22 is provided with a dust suction inlet 41, the dust suction inlet 41 is provided with a rubber dust suction sleeve 42, the rubber dust suction sleeve 42 is contacted with the screen plate 20, the front side wall of the dust extraction pipe 22 is provided with a wind outlet 43, the wind outlet 43 is provided with a second clamping groove 44, the first pipeline 25 is fixedly installed in the dust collecting cabin 19, the front end part of the first pipeline 25 is provided with a second clamping plate 45, the second clamping groove 44 of the dust extraction pipe 22 is movably clamped in the second clamping plate 45 through the second bearing 24, the first pipeline 25 is communicated with the dust extraction pipe 22 through the wind outlet 43, the first cyclone separator 1 and the spiral conveyer 5 are respectively installed in the back chamber 34 of the dust collecting cabin 19, the back side wall of the dust collecting cabin 19 is provided with a first via hole 46, a second via hole 47 and a third via hole 48, the back end of the first pipeline 25 is communicated with the first air inlet 12 of the first draught fan 3 after respectively penetrating through the through hole 55 and the first via hole 46, one end of the second pipeline 26 is communicated with the first air outlet 13 of the first draught fan 3, the other end of the second pipeline is communicated with the first wind inlet 6 of the first cyclone separator 1 after penetrating through the second via hole 47, the feed port 16 of the spiral conveyer 5 is communicated with the first discharge opening 8 of the first cyclone separator 1, the discharge port 17 of the spiral conveyer 5 is located outside the dust collecting cabin 19 after penetrating through the third via hole 48, the back side wall of the dust collecting cabin 19 is further provided with a wind outlet 49, the second air inlet 14 of the second draught fan 4 is communicated with the wind outlet 49 through the third pipeline 27, and the second air outlet 15 of the second draught fan 4 is communicated with the second wind inlet 9 of the second cyclone separator 2 through the fourth pipeline 28.

The screen plate 20 consists of a separation plate 50, a filter screen 51 and a bracket, 52 the separation plate 50 is fixedly installed in the inner side wall of the dust collecting cabin 19, the separation plate 50 is provided with round holes 53, the bracket 52 is installed in the round holes 53, the filter screen 51 is fixedly installed in the bracket 52, the support 35 is installed on the bracket 52, the rubber dust suction sleeve 42 is tightly pressed on the filter screen 51, and the through hole 55 is located below the separation plate 50. The first pipeline 25 is installed in the dust collecting cabin 19 through the first bracket 54. The dust extraction pipe 22 is a square pipe.

What is claimed is:

1. A cotton opening and dust collecting device for refined cotton, comprising a first cyclone separator, a second cyclone separator, a first draught fan, a second draught fan and a spiral conveyer, wherein the first cyclone separator is respectively provided with a first wind inlet, a first wind outlet and a first discharge opening, the second cyclone separator is respectively provided with a second wind inlet, a second wind outlet and a second discharge opening, the first draught fan is respectively provided with a first air inlet and a first air outlet, the second draught fan is respectively provided with a second air inlet and a second air outlet, the spiral conveyer is respectively provided with a feed port and a discharge port, the cotton opening and dust collecting device for refined cotton further comprises a suction pipe, a dust collecting cabin, a screen plate, a motor, a dust extraction pipe, a first bearing, a second bearing, a first pipeline, a second pipeline, a third pipeline and a forth pipeline, a front side wall of the dust collecting cabin is provided with a wind inlet and a collection port, the suction pipe is communicated with an interior of the dust collecting cabin through the wind inlet, the suction pipe is provided with suction inlets in rows, a cabin gate is movably installed in a collection port of the dust collecting cabin, the screen plate is installed in the dust collecting cabin to separate the interior of the dust collecting cabin into a front chamber and a back chamber, the screen plate is provided with a through hole, a middle part of the screen plate is provided with a support, the support is provided with a via hole and a first clamping groove which are mutually penetrated, the dust extraction pipe is located in the front chamber, a back side of the dust extraction pipe is provided with a first clamping plate, the first clamping plate of the dust extraction pipe is movably clamped in the first clamping groove through the first bearing, the motor is fixedly installed in the support through a bracket, an output shaft of the motor is fixedly connected to the first clamping plate of the dust extraction pipe, a back side wall of the dust extraction pipe is provided with a dust suction inlet, the dust suction inlet is provided with a rubber dust suction sleeve, the rubber dust suction sleeve is contacted with the screen plate, a front side wall of the dust extraction pipe is provided with a wind outlet, the wind outlet is provided with a second clamping groove, the first pipeline is fixedly installed in the dust collecting cabin, a front end part of the first pipeline is provided with a second clamping plate, the second clamping groove of the dust extraction pipe is movably clamped in the second clamping plate through the second bearing, the first pipeline is communicated with the dust extraction pipe through the wind outlet, the first cyclone separator and the spiral conveyer are respectively installed in the back chamber of the dust collecting cabin, the back side wall of the dust collecting cabin is provided with a first via hole, a second via hole and a third via hole, a back end of the first pipeline is communicated with the first air inlet of the first draught fan after respectively penetrating through the through hole and the first via hole, one end of the second pipeline is communicated with the first air outlet of the first draught fan, the other end of the second pipeline is communicated with the first wind inlet of the first cyclone separator after penetrating through the second via hole, the feed port of the spiral conveyer is communicated with the first discharge opening of the first cyclone separator, the discharge port of the spiral conveyer is located outside the dust collecting cabin after penetrating through the third via hole, the back side wall of the dust collecting cabin is further provided with a wind outlet, the second air inlet of the second draught fan is communicated with the wind outlet through the third pipeline, and the second air outlet of the second draught fan is communicated with the second wind inlet of the second cyclone separator through the fourth pipeline.

2. The cotton opening and dust collecting device for refined cotton according to claim 1, wherein, the screen plate consists of a separation plate, a filter screen and a bracket, the separation plate is fixedly installed in an inner side wall of the dust collecting cabin, the separation plate is provided with round holes, the bracket is installed in the round holes, the filter screen is fixedly installed in the bracket, the support is installed on the bracket, the rubber dust suction sleeve is tightly pressed on the filter screen, and the through hole is located below the separation plate.

3. The cotton opening and dust collecting device for refined cotton according to claim 1, wherein, the first pipeline is installed in the dust collecting cabin through a first bracket.

4. The cotton opening and dust collecting device for refined cotton according to claim 2, wherein, the first pipeline is installed in the dust collecting cabin through a first bracket.

5. The cotton opening and dust collecting device for refined cotton according to claim 1, wherein, the dust extraction pipe is a square pipe.

6. The cotton opening and dust collecting device for refined cotton according to claim 2, wherein, the dust extraction pipe is a square pipe.

* * * * *